(12) United States Patent
Kobayashi

(10) Patent No.: US 7,508,553 B2
(45) Date of Patent: Mar. 24, 2009

(54) IMAGE DISPLAYING APPARATUS AND IMAGE PICKUP APPARATUS HAVING THE SAME

(75) Inventor: Shuichi Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

(21) Appl. No.: 10/928,536

(22) Filed: Aug. 26, 2004

(65) Prior Publication Data

US 2005/0046909 A1 Mar. 3, 2005

(30) Foreign Application Priority Data

Aug. 29, 2003 (JP) .............................. 2003-209601

(51) Int. Cl.
*H04N 1/04* (2006.01)
(52) U.S. Cl. ...................... 358/474; 358/471; 345/213; 359/197; 359/202; 359/290; 382/132
(58) Field of Classification Search ................. 358/474, 358/471, 199; 345/213; 359/197, 202, 290; 382/132
See application file for complete search history.

(56) References Cited

U.S. PATENT DOCUMENTS

| | | | |
|---|---|---|---|
| 5,467,104 A | 11/1995 | Furness, III et al. | |
| 5,606,447 A | 2/1997 | Asada et al. | |
| 5,765,010 A * | 6/1998 | Chung et al. | .................... 712/1 |
| 5,982,429 A * | 11/1999 | Kamamoto et al. | .... 348/333.06 |
| 6,134,042 A * | 10/2000 | Dhuler et al. | ............... 359/224 |
| 6,245,590 B1 * | 6/2001 | Wine et al. | ..................... 438/52 |
| 6,731,783 B2 * | 5/2004 | Tsujii | ........................... 382/132 |
| 6,867,753 B2 * | 3/2005 | Chinthammit et al. | ......... 345/8 |
| 6,967,685 B2 * | 11/2005 | Hamasaki | .................... 348/314 |

(Continued)

FOREIGN PATENT DOCUMENTS

EP 475491 A2 * 3/1992

(Continued)

OTHER PUBLICATIONS

W. Jung, J. Zhang, L. Wang, P. Smith, Z. Chen, D. McCormick, N. Tien, Three-Dimensional Optical Coherence Tomography Employing a 2-Axis Microelectromechanical Scanning Mirror, Jul./Aug. 2005, IEEE Journal of Selected Topics in Quantum Electronics, vol. 11, No. 4, pp. 806-809.*

(Continued)

*Primary Examiner*—King Y Poon
*Assistant Examiner*—Miya J Cato
(74) *Attorney, Agent, or Firm*—Locke Lord Bissell & Liddell

(57) ABSTRACT

An image displaying apparatus for two-dimensionally scanning a light beam from a light source optically modulated on the basis of image information on a surface to be scanned by a mechanical resonance type rocking operation scanning device, and observing an image formed on the surface to be scanned through an optical system, has a scanning means controlling circuit for controlling the basic state of the repetition cycle of the surface to be scanned to a plurality. It is possible to provide an image displaying apparatus which can make the frame rate of image display variable depending on a subject, can always display a good quality image on a predetermined surface, and enables the image on the predetermined surface to be observed.

14 Claims, 6 Drawing Sheets

U.S. PATENT DOCUMENTS

| | | | |
|---|---|---|---|
| 7,071,931 B2* | 7/2006 | Tegreene et al. | 345/207 |
| 7,180,556 B2* | 2/2007 | Tegreene et al. | 348/744 |
| 7,271,938 B2* | 9/2007 | Kawamura et al. | 358/509 |
| 2002/0067332 A1* | 6/2002 | Hirakata et al. | 345/102 |
| 2003/0103240 A1* | 6/2003 | Silverbrook et al. | 358/1.18 |
| 2004/0061797 A1* | 4/2004 | Takahashi et al. | 348/333.01 |
| 2004/0263943 A1* | 12/2004 | Starkweather | 359/290 |

FOREIGN PATENT DOCUMENTS

| | | | |
|---|---|---|---|
| GB | 2175705 A | * | 12/1986 |
| JP | 7-175005 | | 7/1995 |
| JP | 8-334723 | | 12/1996 |

OTHER PUBLICATIONS

H. Nguyen, J. Su, H. Toshiyoshi, M. Wu, Device Transplant of Optical MEMS for Out of Plane Beam Steering, 2001, IEEE, pp. 325-328.*

D. Fletcher, K. Crozier, K. Guarini, S. Minne, G. Kino, C. Quate, K. Goodson, Microfabricated Silicon Solid Immersion Lens, Sep. 2001, Journal of Microelectromechanical Systems, vol. 10, No. 3, pp. 450-457.*

M. P. Helsel et al.; "Wafer Scale Packaging for a MEMS Video Scanner"; MEMS Design, Fabrication, Characterization, and Packaging; *Proceedings of SPIE*; vol. 4407; (2001); pp. 214-220.

* cited by examiner

IMAGE DISPLAYING APPARATUS AND IMAGE PICKUP APPARATUS HAVING THE SAME

BACKGROUND OF THE INVENTION

1. Field of the Invention

This invention relates to an image displaying apparatus and an image pickup apparatus having the same, and is suitable for displaying an image on a predetermined surface by the use, for example, of scanning means (referred to also as optical scanning means) for two-dimensionally raster-scanning the predetermined surface by a light beam optically modulated on the basis of image information and emitted from light source means, and observing the image on the predetermined surface through an optical system.

2. Related Background Art

In an image displaying apparatus such as an electronic viewfinder system used in a digital camera, a video camera or the like, design is made such that a two-dimensional display element such as transmission type liquid crystal or reflection type liquid crystal and an eyepiece optical system are combined together, and an image formed on the two-dimensional display element is displayed and observed as a virtual image.

In recent years, in such an image displaying apparatus, it has been required for the displayed image to be of higher definition. For such a requirement, in the aforedescribed display element, a number of pixels corresponding to the number of pixels necessary on the display element must be manufactured, and this has led to the problem that the defect of the pixels increases by an amount corresponding to the increase in the number of pixels, or the pixels become small relative to the size of the two-dimensional display element and the manufacture thereof becomes difficult. Further, in a two-dimensional display element utilizing liquid crystal, the response speed of the liquid crystal is low, and this has led to the problem that when a moving image is displayed, there remains an afterimage.

On the other hand, there is known an image displaying apparatus for displaying an image by scanning a surface to be scanned by the use of optical scanning means capable of two-dimensionally scanning a light beam from light source means optically modulated on the basis of image information, instead of the use of a two-dimensional display element, and observing the image (e.g. U.S. Pat. No. 5,467,104). U.S. Pat. No. 5,467,104 shows the technique of scanning red, blue and green light beams in a two-dimensional direction, i.e. horizontal and perpendicular direction, by scanning means, and directly forming a two-dimensional image on a retina through the optical system.

Such an image displaying technique scans a light beam and displays an image, and therefore, need not use a display element formed with a plurality of pixels in accordance with necessary resolution as in the image displaying apparatus using the two-dimensional display element, and has a feature that, in principle, the defect of pixel does not occur.

In realizing such an image displaying apparatus using the scanning means, a micro electro-mechanical system (hereinafter referred to as the MEMS technique) manufactured by a semiconductor process is known as the optical scanning means (e.g. U.S. Pat. No. 5,606,447 (Japanese Patent Application Laid-Open No. H7-175005 and Japanese Patent Application Laid-Open No. H8-334723)).

Optical scanning means manufactured by the MEMS technique is compact and light in weight and capable of operating at a high speed, and such features are suited as an image displaying apparatus. Also, it is known that the MEMS technique of two-dimensional scanning means of head mount type for an image displaying apparatus (e.g. SPIE Conference 4407,19 (June 2001) Wafer Scale Packaging for a MEMS Video Scanner). The optical scanning means by these MEMS techniques is such that a surface reflecting light is mechanically resonance-operated by a torsion bar or the like, and torsion occurring at that time is utilized to incline the surface reflecting light and deflect and scan light incident on the reflecting surface. Since torsion is utilized, the surface reflecting light is not rotated but rocked.

The basic frequency of these mechanical resonance operations is determined by the mechanical dimensions of the optical scanning means. The optical scanning means is driven by the resonance drive by electrostatic power and electromagnetic power.

In the aforementioned U.S. Pat. No. 5,467,104, etc., the optical scanning means of such a resonance type is defined as a first direction and optical scanning means for scanning light in a second direction different from the first direction is disposed to thereby realize two-dimensional scanning.

When an image displaying apparatus using scanning means is applied to an electronic viewfinder system for use in an image pickup apparatus such as a digital camera, it is desired to display a subject, which is a moving object, on the image displaying apparatus on real time and make an observer observe it. Accordingly, for a subject moving at a high speed, an apparatus in which the frame rate of an image is fast becomes necessary.

In the aforementioned U.S. Pat. No. 5,467,104, U.S. Pat. No. 5,606,447 (Japanese Patent Application Laid-Open No. H7-175005) and Japanese Patent Application Laid-Open No. H8-334723, the technique of displaying an image by the use of scanning means is merely disclosed.

SUMMARY OF THE INVENTION

The present invention has as its object the provision of an image displaying apparatus in which a surface to be scanned is scanned by the use of optical scanning means capable of effecting optical scanning in both of a first direction and a second direction different from it, and an image is displayed, and when the image is observed, the basic state of the repetition cycle (frame frequency) of the second direction is controlled to a plurality of states, whereby the frame rate of image display is made variable depending on a subject, and always a good quality image can be displayed on a predetermined surface and the image on the predetermined surface can be observed, and an image pickup apparatus having the same.

According to one aspect of the invention, the image displaying apparatus, which two-dimensionally scans a surface to be scanned by rocking operation scanning means of a mechanical resonance type by a light beam optically modulated on the basis of image information and emitted from light source means, and in which an image formed on the surface to be scanned can be observed through an optical system, has a scanning means controlling circuit for controlling the repetition cycle of the surface to be scanned to a plurality.

In a further aspect of the invention, the foregoing scanning means scans in a first direction on the surface to be scanned by a mechanical resonance type rocking operation, and the scanning means controlling circuit controls the repetition cycle of a second direction different from the first direction to a plurality.

In a further aspect of the invention, the second direction is substantially perpendicular to the first direction, and the scanning means performs raster scanning.

In a further aspect of the invention, the plurality of repetition cycles of the second direction can be selected.

In a further aspect of the invention, the repetition cycle of the second direction is performed scanning the surface to be scanned with varied number of scanning lines.

In a further aspect of the invention, the image pickup apparatus displays an image pickup portion for picking up the image of a subject and the image obtained by the image pickup portion on the above-described image displaying apparatus.

DESCRIPTION OF THE PREFERRED EMBODIMENTS

Some embodiments of the present invention will hereinafter be described with reference to the drawings.

First Embodiment

Figure 1:
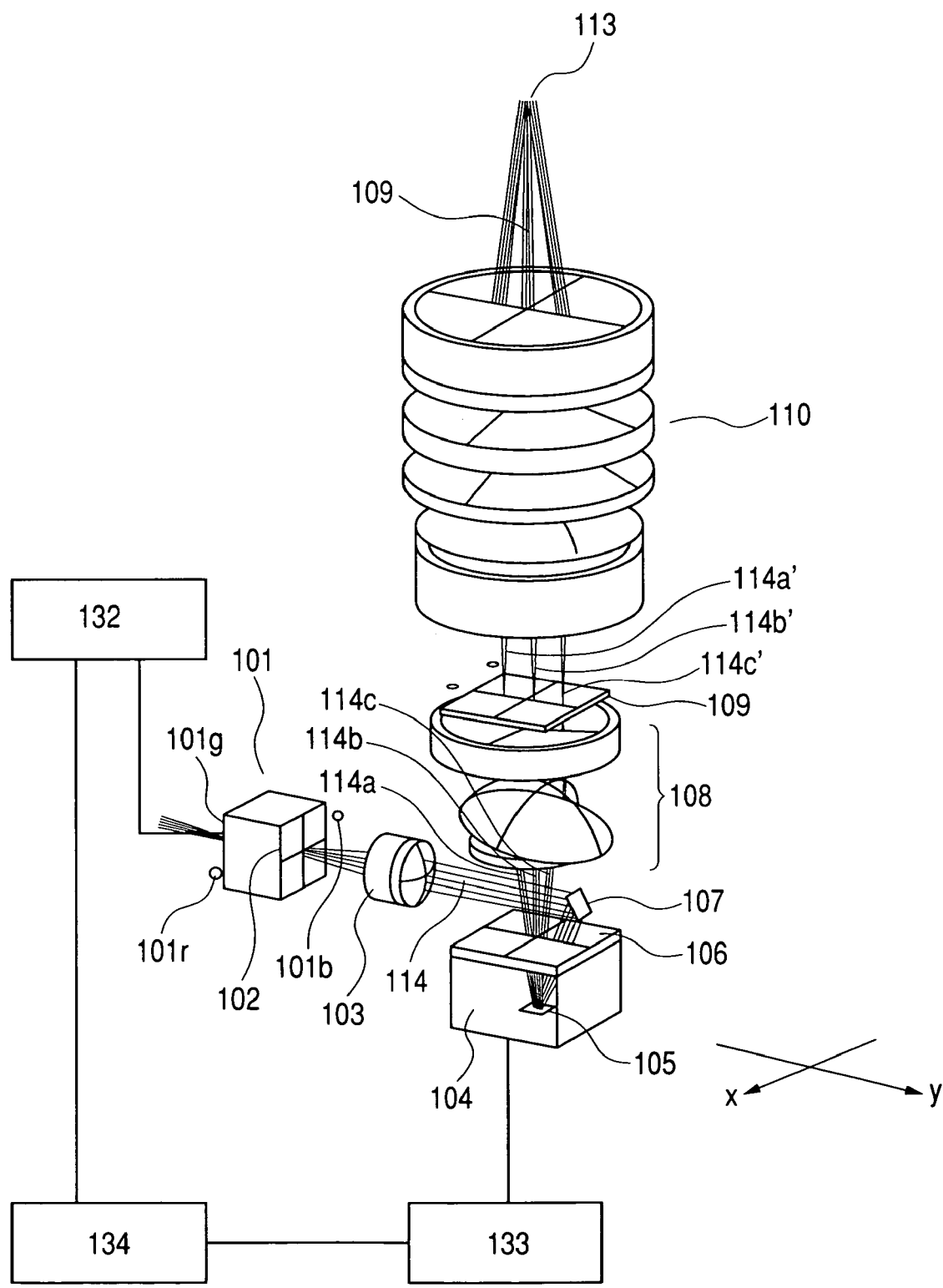
FIG. 1 shows the schematic drawing of the construction of a first embodiment of the image displaying apparatus of the present invention.

FIG. 1 is an illustration of the schematic drawing of the construction of a scanning type image displaying apparatus according to a first embodiment of the present invention. In FIG. 1, light source means 101 emits a light beam optically modulated on the basis of a signal from a light source driving circuit 132. The light beam 114 emitted (optically modulated) from the light source means 101 travels toward optical scanning means 104 capable of performing two-dimensional scanning through a color combining optical system 102 for combining a plurality of color lights into a light beam, a condensing optical system 103 such as a condenser lens or a collimator lens, a deflecting mirror 107 and a cover glass 106 in sequence. The light source means 101 has a red light source 101r emitting red light, a green light source 104g emitting green light, and a blue light source 101b emitting blue light. The color combining optical system 102 is designed to combine a plurality of light beams emitted from the light source means 101 into a light beam and emit it.

The light incident on the optical scanning means 104 is reflected and deflected about a deflection point 105 by the deflecting mirror (reflecting mirror), and two-dimensionally scans on a surface 109 to be scanned through a scanning optical system 108. The light source means 101 and the surface 109 to be scanned are disposed so as to have substantially conjugate relationship by the condensing optical system 103 and the scanning optical system 108, and the surface 109 to be scanned is adapted to be scanned by the light source image of the light source means 101. The surface 109 to be scanned is a transparent surface or a diffusing surface, on which an image is formed.

Light beams 114a, 114b and 114c show examples of three light beams (scanning light beams) along which the light beam 114 from the light source means 101 is scanned by the optical scanning means 104 and travels toward the scanning optical system 108. Condensing points 114a', 114b' and 114c' corresponding to the scanning light beams 114a, 114b and 114c, respectively, are indicated on the surface 109 to be scanned. The condensing points 114a', 114b' and 114c' show examples of scanned points on the surface 109 to be scanned which is scanned by the light beam in a direction indicated by y in FIG. 1 (y-direction). The optical scanning means 104 comprises a construction which is capable of performing two-dimensional scanning which can scan in both of this y-direction and a direction indicated by x perpendicular to it (x-direction). The optical scanning means 104 is drive-controlled by an optical scanning means controlling circuit 133, and the optical scanning means controlling circuit 133 and a light source driving circuit 132 are electrically connected to a display portion controlling circuit 134, and the like, and are drive-controlled in synchronization therewith to thereby display a defined frame number of images on the surface 109 to be scanned.

The optical scanning means controlling circuit 133 controls the number of repetition cycles in the y-direction by a control circuit 133V controlling the scanning cycle in a vertical direction to thereby change the frame frequency. The reference character 133H designates a control circuit for performing scanning in a horizontal direction.

An observer places his pupil at an eye point 113 to thereby observe the virtual image of the image formed on the surface 109 to be scanned by the utilization of an afterimage effect through an eyepiece optical system 110. In FIG. 1, it is to be understood for the sake of convenience that the observer observes the image on the surface 109 to be scanned with the x-direction as the horizontal direction and the y-direction as the vertical direction.

Figure 2:
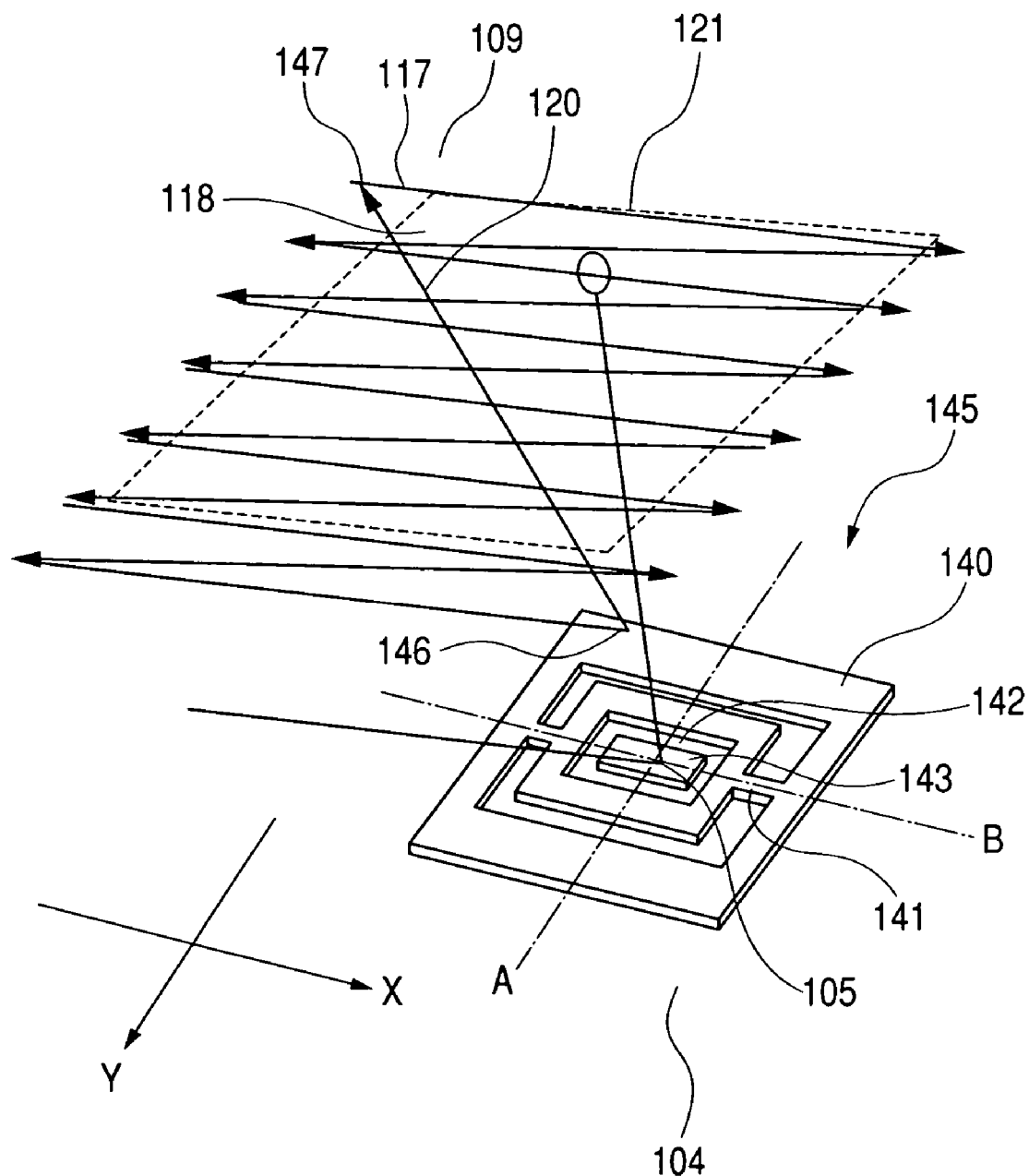
FIG. 2 is an illustration of the essential portions of the scanning means of FIG. 1.

The epitome of the optical scanning means 104 will now be described with reference to FIG. 2. FIG. 2 shows the relative positional relation of the construction of the essential portions of the optical scanning means 104 and the surface 109 to be scanned. The optical scanning means 104 has a substrate 140 on which a reflecting mirror 143 is constituted at the deflection point 105. The reflecting mirror 143 is provided with a torsion bar 142 for rocking the reflecting mirror in the horizontal direction (x-direction), and a torsion bar 141 for rocking the reflecting mirror in the vertical direction (y-direction), and these together form gimbal structure. In the horizontal direction (x-direction), the reflecting mirror 143 is driven by a not shown actuator, and the deflection angle of the reflecting surface of the reflecting mirror 143 is changed by the mechanical resonance action of the torsion of this structure, to perform scanning by light beam. In the vertical direction (y-direction), the reflecting mirror 143 is controlled so as to take synchronization with the horizontal direction (x-direction), and is driven in a sawtooth waveform or a triangular waveform by the not shown actuator. In FIG. 2, a line 117 indicates an example of the outward path of the scanning line by the rocking operation, and a line 118 indicates an example of the homeward path of the scanning line. Actually, the number of the scanning lines is greater than that shown in FIG. 2, however in order to make it readily understood, the number of the scanning lines are shown reduced. The reflecting mirror 143 is operated so as to scan in the direction of arrow 145, which is the y-direction, in synchronization with the rocking operation, and the light beam synchronously emitted from the light source means 101 is optically modulated to thereby display an image within an effective area 121.

When the light beam goes to a scanning end 146 in the vertical direction (y-direction), it returns to a scanning start point 147 as indicated by a return line 120. That is, the repetition cycle of the vertical direction (y-direction) determines the frame rate (frame frequency) of an image.

Table 1 below shows a frame rate calculated from the resolution of image display and the number of scanning lines thereof in the vertical direction (y-direction), and the resonance frequency of mechanical resonance action in the horizontal direction (x-direction).

In Table 1, for example, in the case of SVGA resolution (800×600), at a resonance frequency 20,000 (20 kHz), the frame rate is calculated as 66.67 Hz. FIG. 2 shows the scanning lines in a reduced form, however summing up the numbers of the scanning line 117 in the outward path and the scanning line 118 in the homeward, there are 600 scanning lines within an area displaying an image in the case of SVGA.

In the present embodiment, the frame rate is changed by the change of the number of scanning lines. That is, design is made such that a value obtained by multiplying the frame rate by the number of scanning lines becomes constant.

Figure 3:
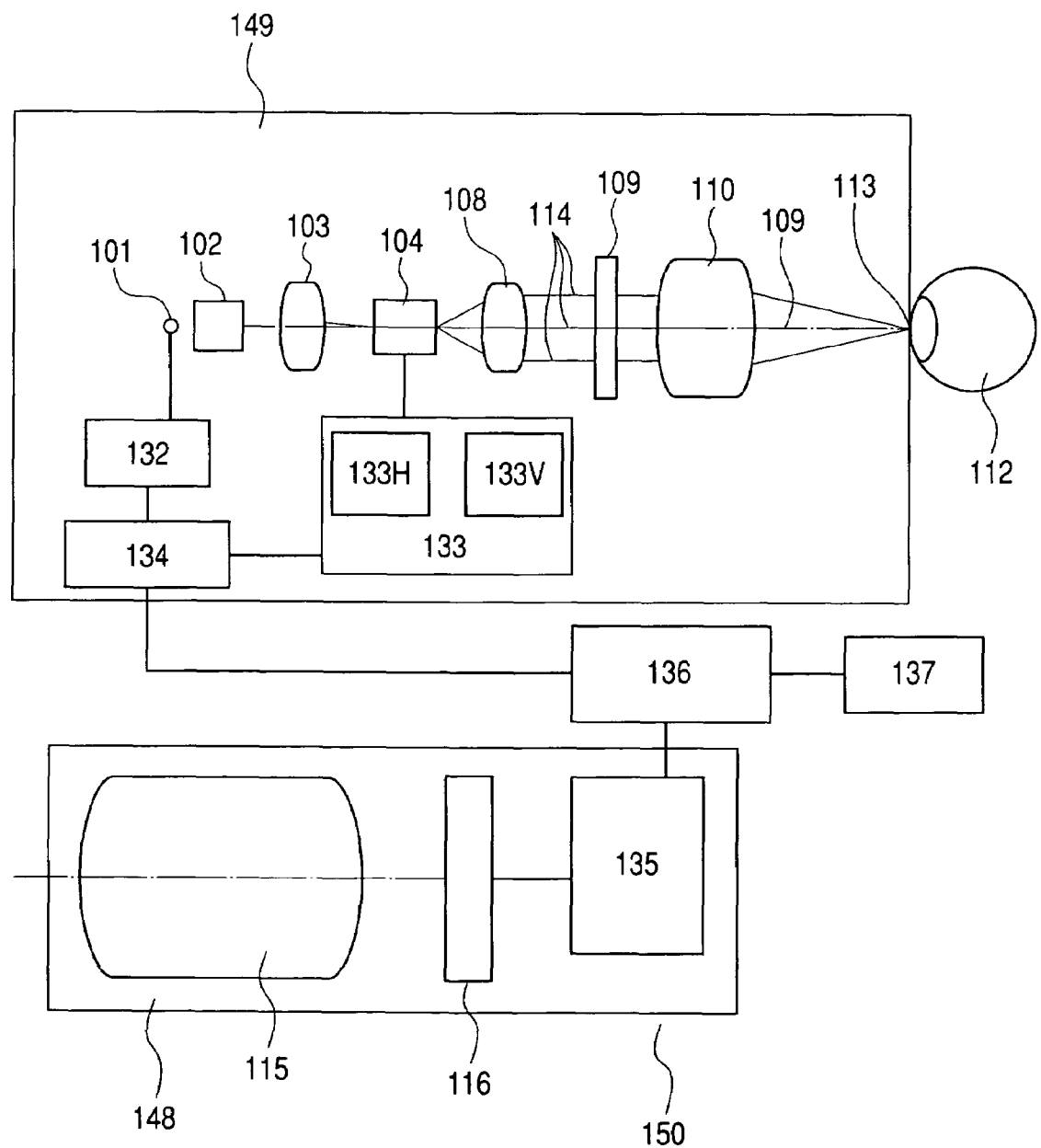
FIG. 3 shows the schematic drawing of the construction of a second embodiment of the image pickup apparatus of the present invention.

FIG. 3 schematically shows the construction of an image pickup apparatus (such as a video camera or a digital camera) carrying thereon the scanning type image displaying apparatus shown in FIG. 1. In FIG. 3, a display portion 149 is shown in a simplified form of the scanning type image displaying apparatus shown in FIG. 1. In FIG. 3, the same members as those in FIG. 1 are given the same reference numerals. The reference numeral 148 designates an image pickup portion having an image pickup optical system 115, an image pickup element (CCD) 116 on which an image is formed by an image pickup optical system 115, and an image pickup element driving circuit 135 for drive-controlling the image pickup element 116. The display portion 149 and the image pickup portion 148 are included in a camera apparatus (image pickup apparatus) 150, and are drive-controlled by an apparatus controlling circuit 136.

The observer (not shown) observes an picked up image by the image pickup portion 148 or an image inputted to the display portion driving circuit 134 of the display portion 149 through the apparatus controlling circuit 136, and scanned and displayed on the surface 109 to be scanned of the display portion 149, by his eyes 112 located at the eye point 113. Also, this image pickup apparatus 150 has the observer's interface portion 137 connected thereto.

Figure 4A:
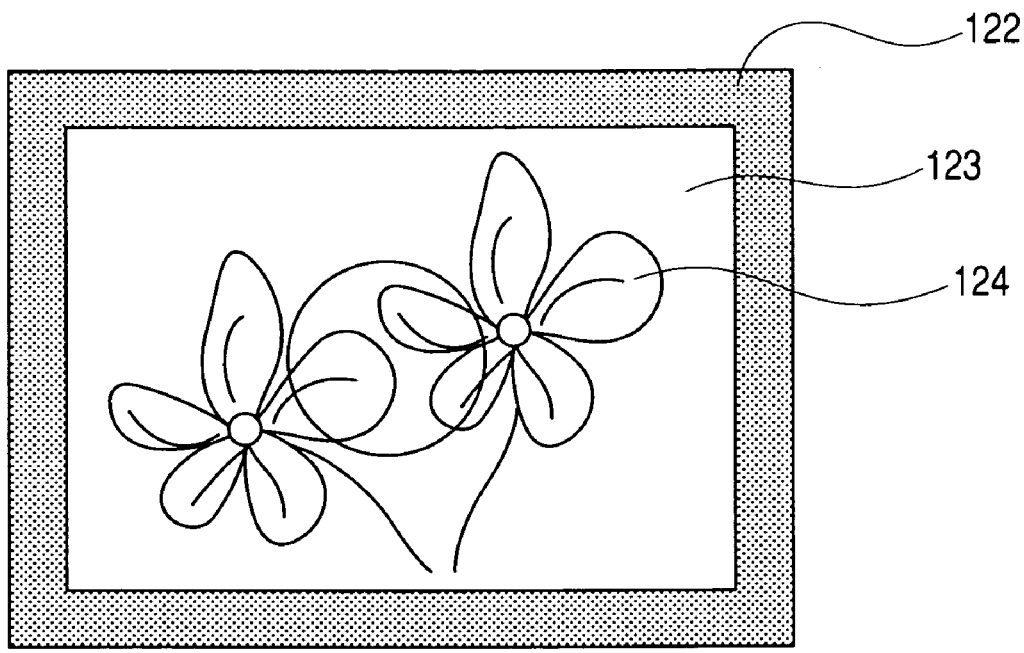
FIGS. 4A and 4B are illustrations of subjects.
Figure 4B:
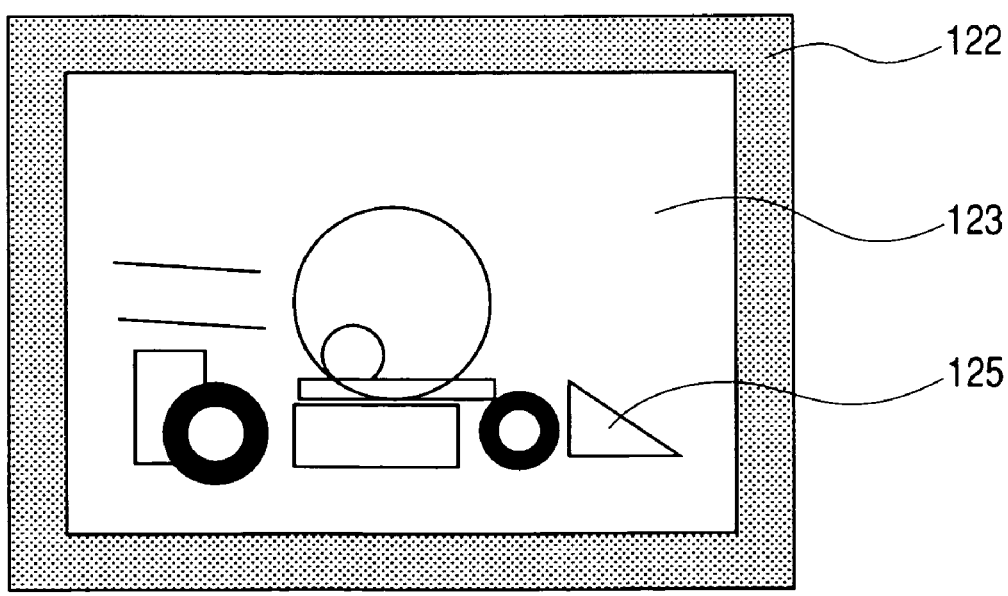

FIGS. 4A and 4B show examples of subjects image-picked up by the image pickup portion 148. In FIGS. 4A and 4B, the reference numeral 122 designates a visual field frame, and the reference numeral 123 denotes an example of an image-picked up area. FIG. 4A shows an example of a subject 124 with little movement such as a plant, and FIG. 4B shows an example of a subject 125 with speedy movement such as a racing car. It is usual to change parameters such as the shutter speed of a shutter provided in the image pickup portion 148, depending on a subject, however at the same time, it sometimes happens that it is required to display the details of the subject to be photographed in the case of the subject 124 with little movement, or to display an image as far as possible on real time in the case of the subject 125 of speedy movement. The observer can select a mode of what subject is to be taken, by the interface portion 137.

Figure 5A:
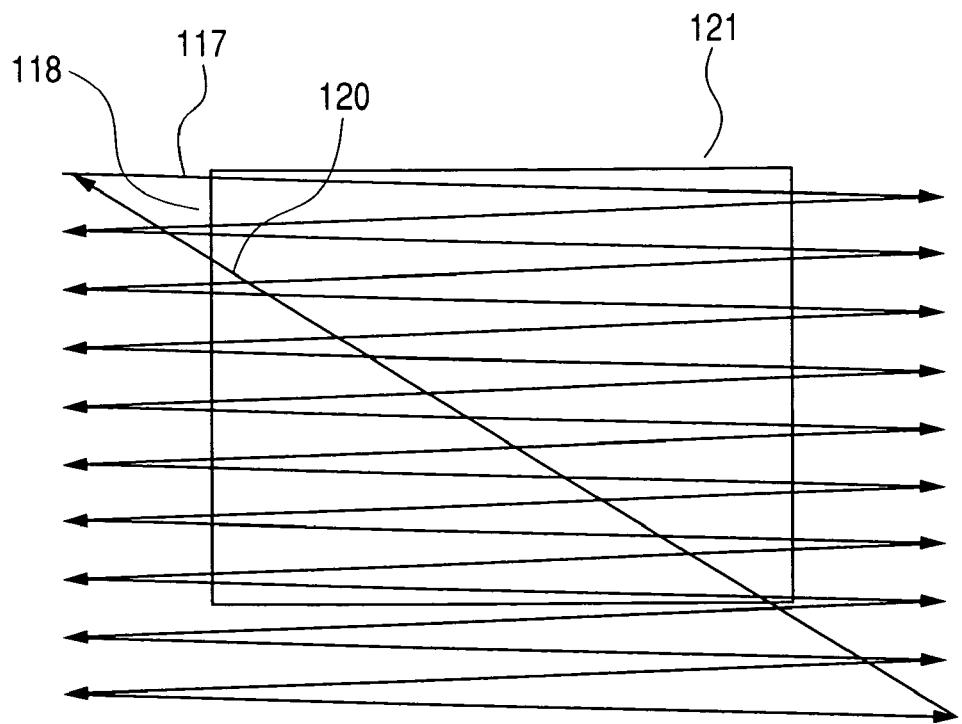
FIGS. 5A and 5B are illustrations of the scanning lines of operating means according to the present invention.
Figure 5B:
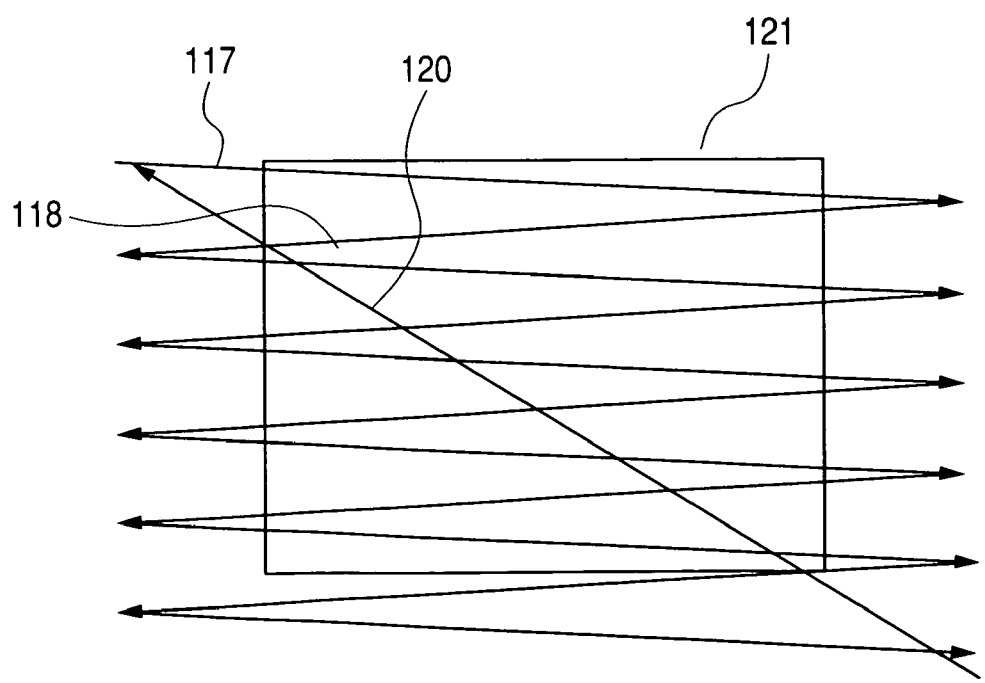

FIGS. 5A and 5B show images displayed on the surface 109 to be scanned of the display portion 149 with the mode being selected by the observer for the case of the subject with little movement such as subject 124 and for the case of the subject with speedy movement such as subject 125, respectively. In both FIGS. 5A and 5B, in order to make the number of scanning lines readily understood, the scanning lines are shown in a reduced form.

FIG. 5A shows a case where the number of scanning lines is set to a large number and the number of frames is reduced so that a detailed image can be observed. FIG. 5B shows a case where the number of scanning lines is decreased and the frame rate is made large correspondingly. In FIGS. 5A and 5B, the same elements as those shown in FIG. 2 are given the same reference numerals.

An explanation of a case based on the scanning means being driven at the resonance frequency 20 kHz of the resonance action as an example, is described in Table 2. If the frequency (frame rate), which is the basis of the scanning in the vertical direction, is set to 66.67 Hz, the number of scanning lines becomes 600. If this number of scanning lines is set to 400, a frequency (frame rate) of 83.33 Hz is obtained and the frame rate can be improved.

As described above, in the present embodiment, the resonance frequency is constant and therefore, from a relationship that the resonance frequency=(the number of scanning lines)×(the frame frequency), the combination of the number of scanning lines and the frame frequency can be changed, respectively.

As described above, in the present embodiment, the number of scanning lines is changed, whereby it is possible to change the frame rate (frame frequency).

While in the present embodiment, the configuration is made such that the observer sets the image pickup mode depending on a subject through the interface portion 137, and changes the frame rate of the display portion 149 in conformity therewith, this is not restrictive, however, the frame rate can be set in conformity with the automatic recognition of the subject on the image pickup element 116. Or a similar effect can be obtained by the change of the frame rate of the display portion 149 depending on the shutter speed condition or the like of image pickup.

Also, changeover between an image pickup state and a state in which an image being recorded is observed may be done.

Also, while in the present embodiment, description has been made for of a case where the two-dimensional scanning means of gimbal structure is used as the scanning means, this is not restrictive, however, a similar effect may be obtained by any scanning means which comprises resonance-operating scanning means and vertical scanning means for scanning in a direction perpendicular thereto, and in which the frame rate can be changeable by the change of the repetition frequency of the vertical scanning means.

Also, in the present embodiment, even in a case where the number of scanning lines is increased to enable an image of high resolution be observed, it is desirable that the frame rate in the vertical direction be 40 Hz or higher.

Also, the resonance frequency in the horizontal direction is changed by temperature or the like and therefore, in conformity therewith, there arises the necessity of controlling the frequency in the vertical direction or the synchronization of the modulation of the light emitted from the light source means, however, any apparatus which controls the number of scanning lines in conformity with a subject or the observer's intention to thereby control the frame rate is likewise applicable.

Further, with the change of the frame rate, the size of the light source image on the surface to be scanned can be changed. If this is done, it becomes possible to fill the gaps among the scanning lines.

Second Embodiment

Figure 6:
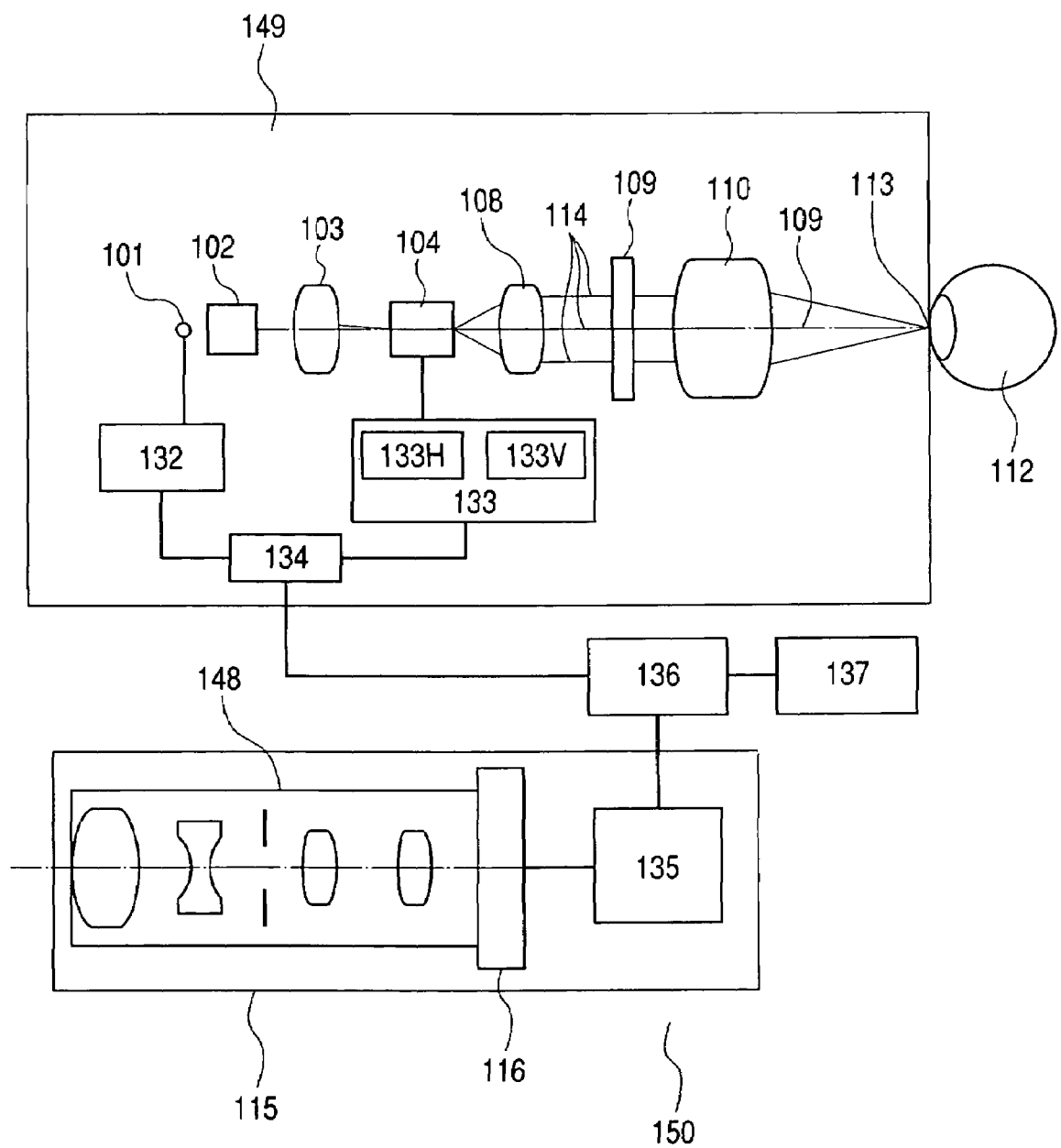
FIG. 6 shows the schematic drawing of the construction of the second embodiment of the image pickup apparatus of the present invention.

FIG. 6 is a schematic view of the essential portions of an image pickup apparatus (camcorder) such as a video camera using a scanning type image displaying apparatus according to a second embodiment of the present invention. In FIG. 6, the same members as those shown in FIG. 3 are given the same reference numerals.

The present embodiment is configured such that a moving image is usually image-picked up by the image pickup portion 148, and is recorded in a not shown recording portion. As in the first embodiment, the interface portion 137 operable by the observer is connected to the apparatus controlling circuit 136. The camcorder of the present embodiment is configured to be capable of recording a stationary image besides a moving image in the not shown recording portion and is configured such that the observer can perform the setting thereof through the interface portion 137. The reference numeral 115 denotes an image pickup system such as a zoom lens.

When picking up a moving image and when picking up a stationary image, image pickup is performed by the image pickup element 135 in the image pickup portion 148. The number of the effective pixels of the image pickup element is greater so that an image of higher resolution can be obtained in the case of a stationary image.

When a picked up stationary image is to be displayed, high resolution is required to display the image and therefore, the number of scanning lines is increased so as to display an image with high resolution, and at this time, the frame frequency is lowered. Also, the technique of displaying at the time is similar to that in the first embodiment. Also, in the case of picking up a moving image, the frame rate for the recording is heightened, and the number of scanning lines is controlled so as to provide an image correspondingly reduced in the number of scanning lines.

Thereby, an image optimum for the environment of use can be provided to the observer.

As described above, according to the present embodiment, it is possible to provide an image displaying apparatus which can display an image of an optimum quality to the observer, and an image pickup apparatus having the same. Also, it is possible to provide an image pickup apparatus having an image displaying apparatus which can display an image suited for an image pickup environment.

TABLE 1

|  |  | SXGA | XGA | SVGA | VGA | QVGA |
|---|---|---|---|---|---|---|
| Number of Pixels in Horizontal Direction | | 1280 | 1024 | 800 | 640 | 320 |
| Scanning Lines in Vertical Direction | | 1024 | 768 | 600 | 480 | 240 |
| Resonance Frequency | 40,000 | 78.13 | 104.17 | 133.33 | 166.67 | 333.33 |
| | 20,000 | 39.06 | 52.08 | 66.67 | 83.33 | 166.67 |
| | 10,000 | 19.53 | 26.04 | 33.33 | 41.67 | 83.33 |
| | 5,000 | 9.77 | 13.02 | 16.67 | 20.83 | 41.67 |

TABLE 2

(Resonance frequency 20 kHz)

| Number of Scanning Lines (Scanning Lines in Vertical Direction) | 1000 | 800 | 600 | 400 | 200 |
|---|---|---|---|---|---|
| Frame Frequency | 39.06 | 52.08 | 66.67 | 83.33 | 166.67 |

According to the present invention, it is possible to achieve an image displaying apparatus which can make the frame rate of image display variable depending on a subject, can always display a good quality image on a predetermined surface and enables the image on the predetermined surface to be observed.

This application claims priority from Japanese Patent Application No. 2003-209601 filed Aug. 29, 2003, which is hereby incorporated by reference herein.

What is claimed is:

1. An image displaying apparatus comprising:
a light source means;
a scanning means for two-dimensional scanning a light beam optically modulated on the basis of image information and emitted from the light source means on a surface to be scanned by a mechanical resonance type rocking operation; and
an optical system for observing therethrough an image formed on the surface to be scanned;
wherein the image displaying apparatus comprises a scanning means controlling circuit adapted to automatically control at least one of a repetition cycle of the light beam in a particular direction across the surface to be scanned and the number of scanning lines of the light beam in the same direction based upon the recognition of a subject by an image pickup element,
wherein the scanning means scans in a first direction on the surface to be scanned by the mechanical resonance type rocking operation, and the scanning means controlling circuit controls the scanning in a second direction differing from the first direction, and
wherein, at a constant resonance frequency, the repetition cycle of the second direction and the number of scanning lines in the second direction are inversely related.

2. An image displaying apparatus according to claim 1, wherein the second direction is substantially perpendicular to the first direction, and the scanning means performs raster scanning.

3. An image displaying apparatus according to claim 1, wherein the number of scanning lines scanning the surface to be scanned in the second direction during a moving image display mode is less than the number of scanning lines during a stationary image display mode.

4. An image displaying apparatus according to claim 1, wherein the repetition cycle of the second direction during a moving image display mode is higher than the repetition cycle of the second direction during a stationary image display mode.

5. An apparatus comprising:
an image pickup portion for the image pickup of a subject; and
an image display apparatus for displaying an image obtained by the image pickup portion, the image display apparatus including:
a light source means;
a scanning means for two-dimensional scanning a light beam optically modulated on the basis of image information and emitted from the light source means on a surface to be scanned by a mechanical resonance type rocking operation;
an optical system for observing therethrough an image formed on the surface to be scanned; and
a scanning means controlling circuit adapted to automatically control at least one of a repetition cycle of the light beam in a particular direction across the surface to be scanned and the number of scanning lines of the light beam in the same direction based upon the recognition of a subject by an image pickup element, wherein the scanning means scans in a first direction on the surface to be scanned by the mechanical resonance type rocking operation, and the scanning means controlling circuit controls the scanning in a second direction differing from the first direction, and wherein, at a constant resonance frequency, the repetition cycle of the second direction and the number of scanning lines in the second direction are inversely related.

6. An apparatus according to claim 1, wherein the second direction is substantially perpendicular to the first direction, and the scanning means performs raster scanning.

7. An apparatus according to claim 5, wherein the number of scanning lines scanning the surface to be scanned in the second direction during a moving image display mode is less than the number of scanning lines during a stationary image display mode.

8. An apparatus according to claim 1, wherein the repetition cycle of the second direction during a moving image display mode is higher than the repetition cycle of the second direction during a stationary image display mode.

9. An image displaying apparatus comprising:
   a light source means;
   a scanning means for two-dimensional scanning a light beam optically modulated on the basis of image information and emitted from the light source means on a surface to be scanned by a mechanical resonance type rocking operation; and
   an optical system for observing therethrough an image formed on the surface to be scanned;
   wherein the image displaying apparatus comprises a scanning means controlling circuit adapted to automatically control at least one of a repetition cycle of the light beam in a particular direction across the surface to be scanned and the number of scanning lines of the light beam in the same direction based upon the recognition of a subject by an image pickup element,
   wherein the scanning means scans in a first direction on the surface to be scanned by the mechanical resonance type rocking operation, and the scanning means controlling circuit controls the scanning in a second direction differing from the first direction, and
   wherein the number of scanning lines scanning the surface to be scanned in the second direction during a moving image display mode is less than the number of scanning lines during a stationary image display mode.

10. The imaging display apparatus according to claim 9, wherein the second direction is substantially perpendicular to the first direction, and the scanning means performs raster scanning.

11. The imaging display apparatus according to claim 9, wherein the repetition cycle of the second direction during a moving image display mode is higher than the repetition cycle of the second direction during a stationary image display mode.

12. An apparatus comprising:
   an image pickup portion for the image pickup of a subject; and
   an image display apparatus for displaying an image obtained by the image pickup portion, the image display apparatus including:
   a light source means;
   a scanning means for two-dimensional scanning a light beam optically modulated on the basis of image information and emitted from the light source means on a surface to be scanned by a mechanical resonance type rocking operation;
   an optical system for observing therethrough an image formed on the surface to be scanned; and
   a scanning means controlling circuit adapted to automatically control at least one of a repetition cycle of the light beam in a particular direction across the surface to be scanned and the number of scanning lines of the light beam in the same direction based upon the recognition of a subject by an image pickup element,
   wherein the scanning means scans in a first direction on the surface to be scanned by the mechanical resonance type rocking operation, and the scanning means controlling circuit controls the scanning in a second direction differing from the first direction, and
   wherein the number of scanning lines scanning the surface to be scanned in the second direction during a moving image display mode is less than the number of scanning lines during a stationary image display mode.

13. An apparatus according to claim 12, wherein the second direction is substantially perpendicular to the first direction, and the scanning means performs raster scanning.

14. An apparatus according to claim 12, wherein the repetition cycle of the second direction during a moving image display mode is higher than the repetition cycle of the second direction during a stationary image display mode.

* * * * *